United States Patent [19]
Whitfield

[11] Patent Number: 5,333,923
[45] Date of Patent: Aug. 2, 1994

[54] TELESCOPING RID FOR PROTECTING THE SIDE BODY STRUCTURE OF A VEHICLE

[76] Inventor: Raymond E. Whitfield, Rte. 9, Box 122C, Kinston, N.C. 28501

[21] Appl. No.: 157,522

[22] Filed: Nov. 26, 1993

[51] Int. Cl.⁵ .............................................. B60R 19/42
[52] U.S. Cl. ..................... 293/128; 293/21; 293/155
[58] Field of Search ................ 293/118, 128, 21, 155, 293/102; 280/770

[56] References Cited

U.S. PATENT DOCUMENTS

| | | | |
|---|---|---|---|
| 2,594,491 | 4/1952 | Persons | 293/128 X |
| 3,909,053 | 9/1975 | Koch | 280/770 X |
| 4,437,697 | 3/1984 | Hinojos | 293/128 X |
| 4,648,644 | 3/1987 | Swanson | 293/128 |
| 5,193,869 | 3/1993 | Land | 293/128 |

Primary Examiner—Dennis H. Pedder
Attorney, Agent, or Firm—Rhodes, Coats & Bennett

[57] ABSTRACT

The present invention relates to a kit or assembly for mounting to a vehicle to protect the side body and particularly the doors of the vehicle from being banged and scarred by doors being opened from other vehicles. When mounted on a vehicle, the side body protector includes a telescoping rod that is extended from a rear wheel well to a front wheel well. The extended telescoping rod is supported in spaced apart relationship from the vehicle by a support structure secured about both the front and rear wheel wells.

7 Claims, 3 Drawing Sheets

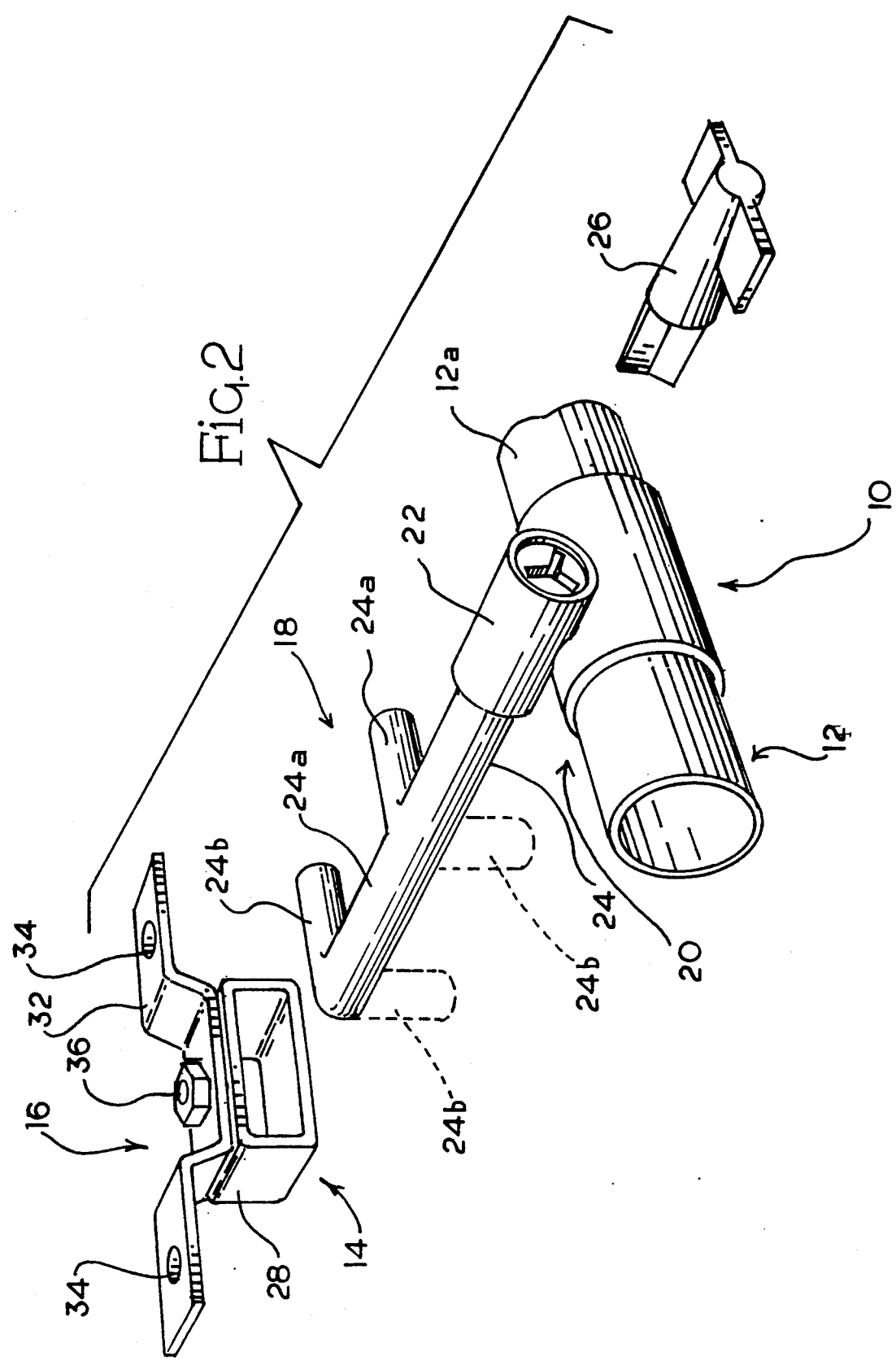

TELESCOPING RID FOR PROTECTING THE SIDE BODY STRUCTURE OF A VEHICLE

FIELD OF INVENTION

The present invention relates to motor vehicles, and more particularly to a side body protector for protecting the side body and doors of a vehicle.

BACKGROUND OF THE INVENTION

Automotive owners go to great lengths to protect their automobiles and prevent doors from adjacently parked automobiles from being opened and banging against their vehicle. It is not uncommon to spot a vehicle parked in a far isolated area of a parking lot for the sole purpose of avoiding the possibility of a door being opened into the side of that vehicle.

There have been many attempts by inventors to design a practical and effective side body protector for a vehicle. For example, one is referred to the disclosures found in U.S. Pat. Nos. 4,561,685; 4,810,013; 4,674,783; 4,002,363; 4,401,331; 4,437,697; 4,493,502; 4,991,891; 5,071,181; and 5,184,857. These patents disclose various devices and attachments that are designed primarily to protect the side body and side doors of a parked vehicle. These patents range from protective side pads to removable body protector guards.

Most all prior art devices or attachments designed to protect the side body of a vehicle have serious drawbacks or shortcomings. For example, many such attachments are difficult to install and use. Some of these prior art devices are very expensive. Finally, some of the devices used in the past to protect the side body of parked vehicles simply do not work.

Therefore, there is a need for a side body protector attachment for a vehicle that is easy to install and use, and which is really effective to protect the side body of the structure and is not unreasonably expensive.

SUMMARY AND OBJECTS OF THE INVENTION

The present invention entails a side body protector that is designed to overcome the shortcomings and disadvantages of prior art devices. In particular, the present invention entails a side body attachment comprised of a telescoping rod that is adapted to be extended and mounted such that the same extends between the vehicle wheel wells and is supported outwardly from the vehicle body. In fact, the telescoping rod can be moved to a retracted position, locked, and stationed next to a wheel well where the retracted rod assumes a transport mode. The retracted rod may remain in that position while the vehicle is being driven and the telescoping rod is not extended for protection purposes.

In addition, the design of the present invention also permits the entire telescoping rod to be locked to the vehicle when in the extended and operative mode, and also permits the telescoping rod to be entirely removed from the side of the vehicle for storage in the trunk or in the vehicle itself. This obviously makes the side body protector of the present invention very versatile but yet effective.

It is therefore an object of the present invention to provide an attachment for a vehicle for protecting the side body thereof that is easy to install and easy to use.

A further object of the present invention resides in the provision of a side body protector that is effective to protect a substantial portion or run of the side body of a vehicle from impact from doors of other vehicles.

Still a further object of the present invention is to provide a side body protector of the character referred to above that can be attached to the vehicle in a transport mode such that the device may assume an attached position to the vehicle even when not being used in a protecting mode.

A further object of the present invention resides in the provision of a side body protector that is relatively inexpensive but effective and which is durable.

It is also an object of the present invention to provide a side body protector in the form of a telescoping rod that in an operative and protecting mode is extended along the side of the vehicle body being protected but wherein the telescoping rod can be disposed in a retracted position and secured to the vehicle and actually transported with the vehicle while assuming an inoperative attached mode.

Still a further object of the present invention resides in the provision of a side body protector of the character referred to above which can be securely locked to the vehicle when disposed in the extended operative position.

It is also an object of the present invention to provide a side body protector of the character referred to above that can be totally removed from the side of the vehicle when not in use or can be moved to a retracted position adjacent one wheel well of the vehicle.

Other objects and advantages of the present invention will become apparent and obvious from a study of the following description and the accompanying drawings which are merely illustrative of such invention.

BRIEF DESCRIPTION OF THE DRAWINGS

FIG. 2 is an exploded view showing the basic components of the present invention that are used to secure the telescoping rod to the respective wheel wells of the vehicle.

DETAILED DESCRIPTION OF THE INVENTION

Figure 1:
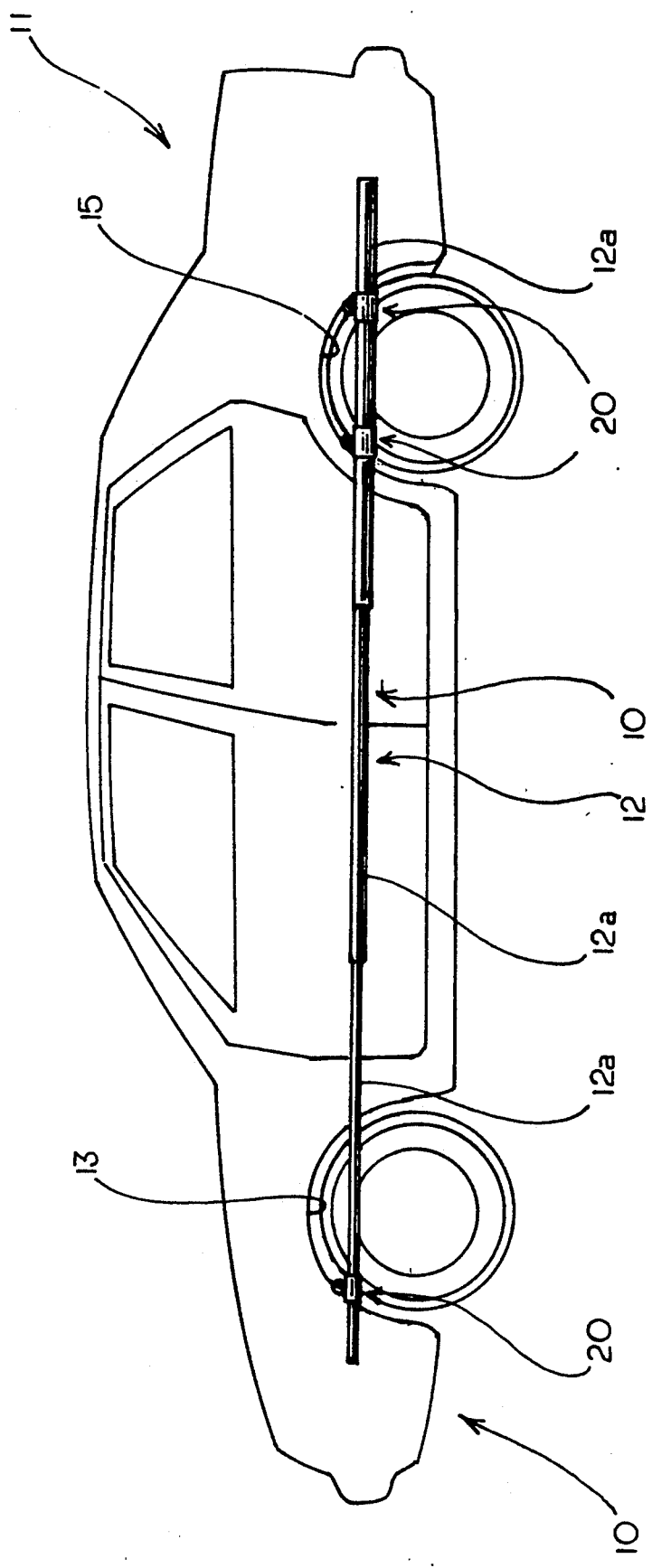
FIG. 1 is a side elevational view with the side body protector of the present invention shown therein in an extended and operative position.

With further reference to the drawings, the side body vehicle protector of the present invention is shown therein and indicated generally by the numeral 10. Before getting into a detailed discussion of the side body protector 10, it is seen that the same is designed to fit along the side of an automobile 11 or other type of vehicle and to extend, when in an operative mode, from a front wheel well 13 to a rear wheel well 15. Note that the body protector 10 when mounted in an operative mode, is spaced outwardly from the side of the vehicle 11 that the same protects.

Now, turning to a discussion of the side body protector 10 of the present invention, it is seen that the same includes a telescoping rod indicated generally by the numeral 12. The telescoping rod 12 includes multi-telescoping sections 12a. In the case of the embodiment illustrated, the telescoping rod includes three telescoping sections 12a. Telescoping rod 12 is adapted to assume a retracted and inoperative position and is also adapted to be extended to an operative position shown in FIG. 1.

Continuing to refer to the body protector 10 which can be provided in the form of a kit or other type of assembly package, the body protector 10 includes a series of locking receptors indicated generally by the numeral 14. Each locking receptor 14 is designed to be mounted by a fastener, indicated generally by the numeral 16, about either a front or rear wheel well 13, 15 of the vehicle 11 to be protected.

The side body protector 10 further includes a locking member 18 that is adapted to be secured and locked within a respective locking receptor 14. Secured to each locking member 18 is a carrier or sleeve, indicated generally by the numeral 20. The carrier or sleeve 20 is adapted to be secured to a respective section 12a of a telescoping rod. Thus, it is appreciated that in use the telescoping rod 12 is disposed within the respective carriers or sleeves 20 which are in turn supported by the locking receptors 14 that are secured via the fastener 16 to a respective vehicle wheel well 13, 15.

With further reference to the locking member 18, it is seen that the same comprises a lock rod 24. The lock rod 24 includes a central rotating shaft 24a which includes a pair of turned ends or legs 24b. The central shaft 24a of the lock rod 24 is rotatively journaled within the locking collar 22. The central shaft 24a is confined within the locking collar 22 such that the same can only be rotated by certain key 26. The structure of the locking collar 22 and the lock rod 24 is such that the lock rod 24 cannot routinely be rotated within the locking collar 22 except via the key 26.

It is appreciated that the locking rod 24, locking collar 22, and the key 26 do not present a total and fool-proof locking arrangement. Based on the design shown herein, the lock rod 24 can be turned from the bent or turned end 24b. However, as expressed above, the lock rod 24 cannot routinely be rotated from a locked position to an unlocked position. However, it is appreciated that if a more secure and more fool-proof approach were desired, that the locked rod 24 could be locked within a housing or locking collar 22 by a conventional key lock system.

Now turning to the locking receptor 14, it is seen that the same includes a housing 28 having an insert 30 formed therein. The insert opening 30 extends completely through the housing 28 and is particularly elongated such that the L-shaped locking rod 24 can be inserted therethrough.

The fastener 16 takes the form of a generally U-shaped bracket 32 that includes a pair of spaced apart bolt or screw openings 34. The respective brackets 32 are secured to the vehicle 11 by securing the same to an internal area within a respective front or rear wheel well 13, 15. The housing 28 is secured to the U-shaped bracket 32 by conventional swivel 36. This enables the locking receptor 14 and the housing 28 thereof to rotate with respect to the U-shaped bracket 32 such that a respective locking rod 24 can be conveniently aligned with the insert opening 30 of the locking receptor 14.

In use, the carrier or sleeve 20 is firmly secured to a respective section of the lock rod 12. The telescoping rod 12 is extended and the individual lock rods 24 that are secured to the respective sleeves or carriers 20 are rotated by the key 26 such that the turned end 24b is aligned with the insert opening 30 of the locking receptor 14. Then the locking rods 24 can be inserted through the insert openings 30 and then the respective locking rods 24 are rotated by the key 26 such that the turned ends or legs 24b of the locking rod is turned down and out of alignment with insert opening 30. Consequently, the respective locking rods 24 are securely locked in each of the respective locking receptors 14.

In the embodiment illustrated in FIG. 1, there are two locking receptors 14 mounted in the rear wheel well 15 of the vehicle 11 and a single locking receptor 14 mounted in the front wheel well 13 of the vehicle. Thus, the telescoping protector rod 12 is supported at three points or areas adjacent the respective front and rear wheel wells 13, 15 of the vehicle. Once the locking rod 24 has been turned to its locking position, it is appreciated that the locking rods 24 cannot be routinely removed from the locking receptors 14. In the locked mode, it is appreciated that the lock rods 24 and the telescoping rod 12 cannot be routinely removed from the respective locking receptors 14.

In order to remove the telescoping rod 12 from the vehicle, it is appreciated that by using the key 26 that the locking rods 24 can be turned to the unlocked position and removed from the locking receptors 14. Then the telescoping rod 12 can be collapsed and stored in the trunk of the vehicle or in the car.

Figure 1A:
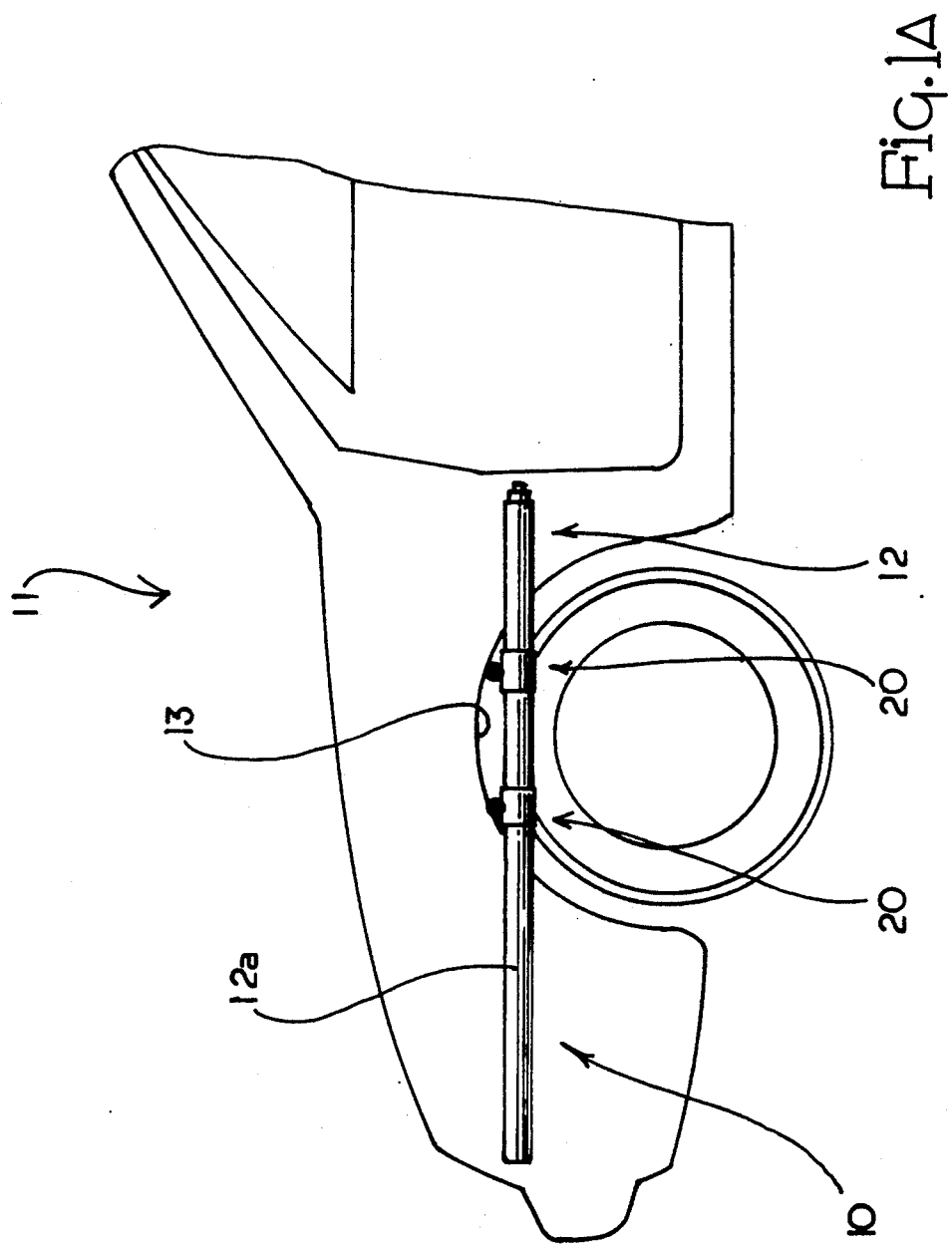
FIG. 1A is a fragmentary side elevational view of a vehicle having the side body protector of the present invention shown therein in a retracted position and secured to the front wheel well of the vehicle.

It is appreciated that in some car designs that the telescoping rod 12 can simply be removed from one wheel well and then retracted. Once retracted, the telescoping rod 12 can be rotated in conventional fashion to where the individual retracted sections 12a are locked. Details of the telescoping locking structure are not shown because such is conventional in extension-type boom arms and extensible handles, etc. In this case, once the telescoping rod 12 has been retracted, the same may remain mounted to a respective wheel well and stationed there at in the retracted position while the vehicle is actually driven (See FIG. 1A). Once the vehicle is parked, then the operator can simply extend the telescoping rod 12 to the position shown in FIG. 1. Expressed in another way, the telescoping rod 12 can be retracted to a position adjacent the front wheel well 13, for example. There, the telescoping rod can be rotated to a locked position that prohibits the telescoping rod from being inadvertently extended. Again, see FIG. 1A. This approach may also be particularly suited for a two-door vehicle because in such a case, the retracted telescoping rod 12 would not interfere with the opening and closing of rear doors.

Also, it should be appreciated that the sleeves or carriers 20 that hold the various sections 12a of the telescoping rod 12 could be of a C-shape and could be of a design where the C-shaped jaws can be opened and closed. This would permit the telescoping rod 12 to be conveniently inserted into the C-shaped jaws and held therein but at the same time would permit the entire telescoping rod 12 to be removed from the C-shaped jaws and stored in the trunk or some other part of the vehicle. In such a case, the C-shaped jaws would remain affixed adjacent the front and rear wheel wells 13, 15 of the vehicle 11.

From the foregoing specification and discussion, it is appreciated that the present invention presents a new and useful vehicle side body protector that can be easily installed on the vehicle and which is effective to protect the same.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An attachment for a vehicle having front and rear wheel wells for protecting the body of the vehicle, comprising:
    a) a telescoping side body protector for protecting the side body of the vehicle and particularly the doors of the vehicle from impact from other vehicle doors and the like;
    b) the telescoping side body protector including a multi-sectional elongated telescoping rod movable from a retracted position to an extended position and wherein in the extended position the telescoping rod extends from the front wheel well to the rear wheel well and is spaced outwardly from the vehicle, and wherein in a retracted position the telescoping rod may assume a transport mode and be supported in the retracted mode adjacent a respective wheel well;
    c) a series of sleeves secured to respective sections of the elongated telescoping rod;
    d) a locking member secured to each sleeve and extending outwardly from both the sleeve and the telescoping rod;
    e) a series of locking receptors for receiving the locking members and holding the locking members therein in a locked mode such that in the locked mode the respective locking members are held in a locked position within the locking receptors;
    f) each locking member being movable between a locked and unlocked position within a respective locking receptor wherein in a locked position a respective locking rod is securely held within a respective locking receptor and wherein in the unlocked position the respective locking members can be removed from the respective locking receptors;
    g) at least one key for unlocking the locking members from the locking receptors such that the locking member and the telescoping rod can be removed from the locking receptors; and
    h) fasteners for securing the locking receptors in the front and rear wheel wells of the vehicle such that the elongated telescoping rod can be secured to the vehicle by inserting the locking members in to the respective locking receptors such that in an extended position the telescoping elongated rod extends from the front wheel well to the rear wheel well and protects the side body of the vehicle, and wherein in a retracted position the telescoping rod may be supported in a transport mode by the locking receptors adjacent a respective wheel well.

2. The attachment of claim 1 wherein each locking receptor includes an insert opening and wherein each locking member includes a locking rod that may be extended into the insert opening where the locking receptor may act to lock the locking rod within the insert opening.

3. The attachment of claim 2 wherein the insert opening extends completely through the locking receptor, and wherein the locked rod is of a general L shape and wherein the relationship between the L shaped locking rod and the insert opening is such that the locking rod may be inserted into and through the insert opening and rotated to a locked position.

4. The attachment of claim 3 further including a swivel connected between each locking receptor and the fastener such that the locking receptor can be rotated with respect to the fastener such that the locking receptor can be appropriately aligned with the lock rod.

5. The attachment of a vehicle of claim 4 wherein the fastener for securing each locking receptor includes a bracket for securement in the wheel well of the vehicle.

6. A method of protecting the side body and doors of a vehicle from impacts from doors of other vehicles and the like comprising the steps of:
    a) mounting at least one support to both the rear and front wheel wells of the vehicle to be protected;
    b) extending locking connectors from each of the supports mounted in the front and rear wheel wells, the step of extending the connectors including extending the connectors outwardly from the supports and outwardly from the front and rear wheel wells;
    c mounting a rod holder to each locking connector;
    d) securing a telescoping rod-type body protector to one rod holder;
    e) protecting the side body of the vehicle by telescoping the rod-type body protector and extending the same from one wheel well to another wheel well and securing the extended telescoping rod to the respective rod holders such that the extended telescoping rod assumes an outwardly spaced position with respect to the side body of the vehicle;
    f) locking the locking connectors in the respective supports by turning the locking connectors from an unlocked position to a locked position so as to secure the locking connectors within the respective supports; and
    g) removing the locking connectors from the respective supports by utilizing a key to unlock the locking connectors from the supports and wherein the unlocking step includes rotating the locking connectors from the locked position to the unlocked position and pulling the respective locking connectors from the respective supports, allowing the locking connectors, and rod holders and telescoping rod to be removed as a unit.

7. The method of claim 6 including the step of retracting the telescoping rod-type body protector to a retracted position adjacent one of the wheel wells and leaving the telescoping rod in the retracted position such that the retracted telescoping rod can be transported with the vehicle and wherein in the retracted position the retracted telescoping rod does not interfere with doors associated with the vehicle thereby allowing the doors associated with the vehicle to be opened and closed while the telescoping rod remains in the retracted position.

* * * * *